R. B. GREENWAY.
CAR BRAKE OPERATING MECHANISM.
APPLICATION FILED SEPT. 7, 1916.
1,248,480.
Patented Dec. 4, 1917.
2 SHEETS—SHEET 1.
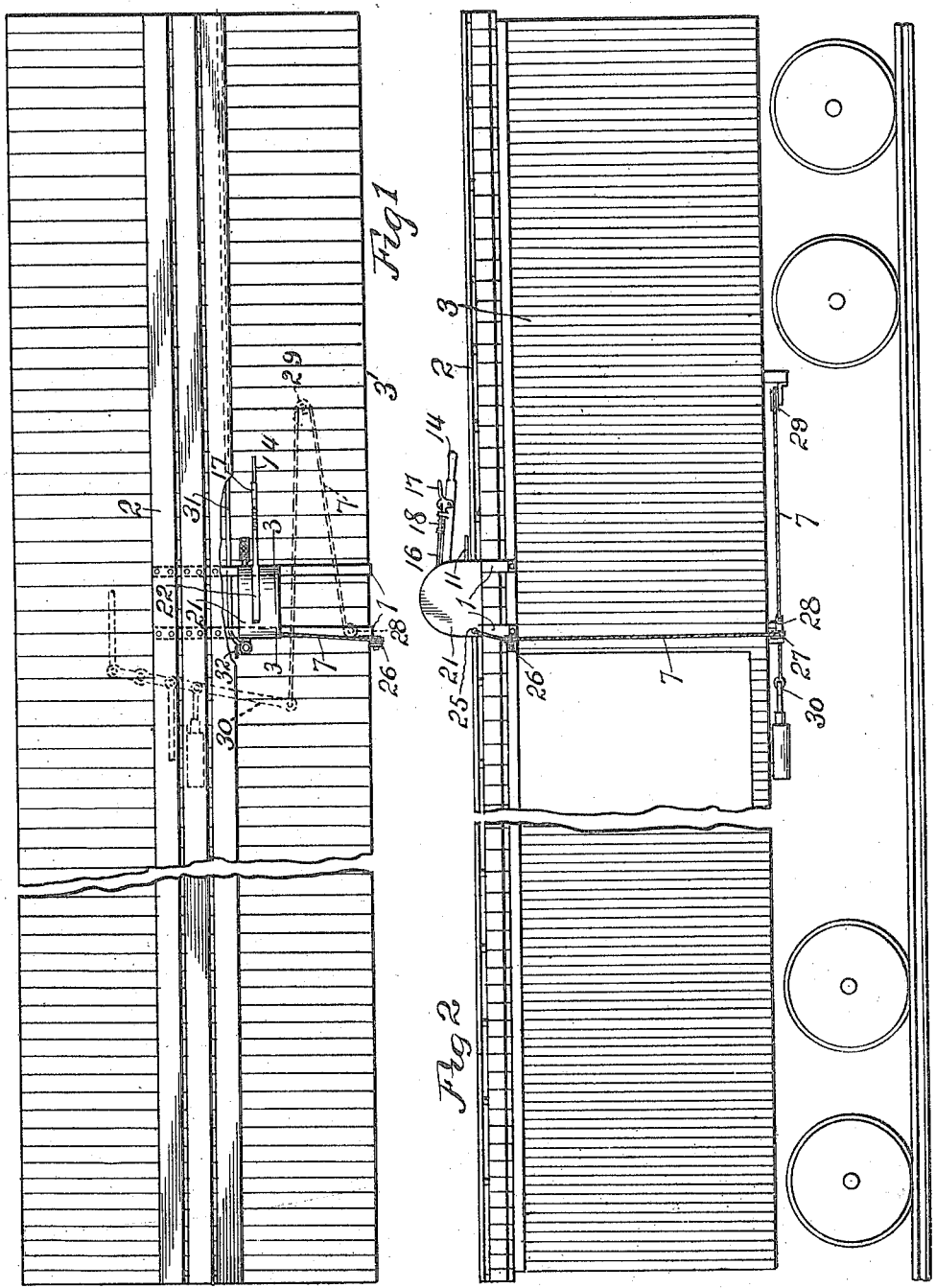
WITNESS:
R. E. Hamilton
INVENTOR.
Robert B. Greenway
BY
Warren D. House
His ATTORNEY R. B. GREENWAY.
CAR BRAKE OPERATING MECHANISM.
APPLICATION FILED SEPT. 7, 1916.
1,248,480.
Patented Dec. 4, 1917.
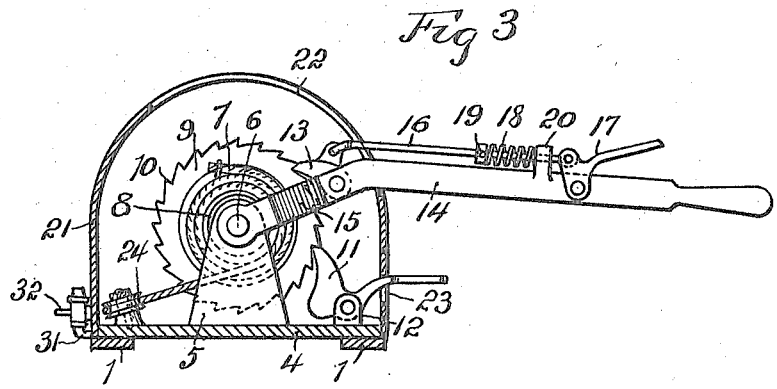
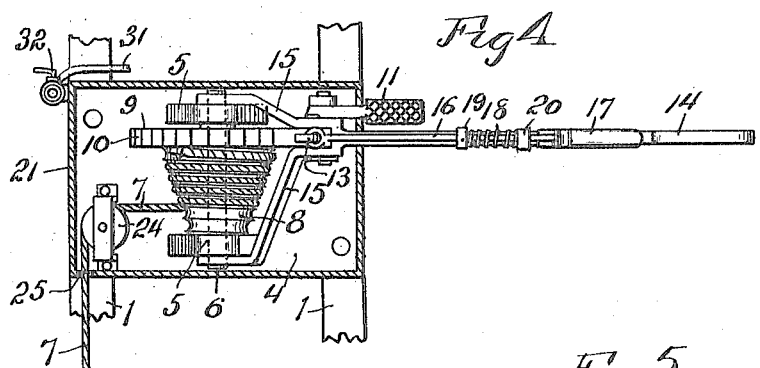
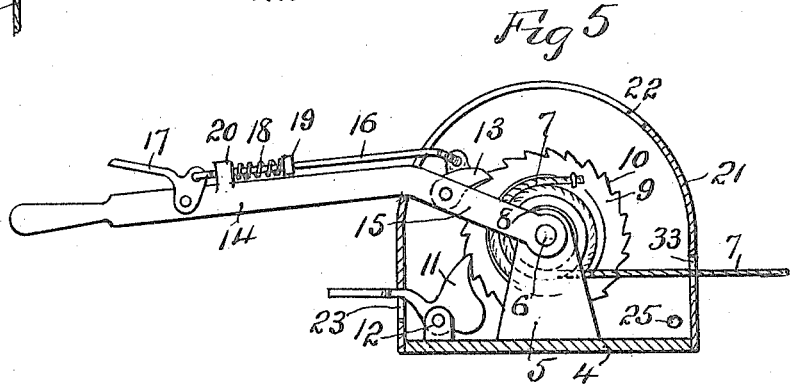
WITNESS:
R. E. Hamilton
INVENTOR.
Robert B. Greenway
BY
Warren D. House
His ATTORNEY

UNITED STATES PATENT OFFICE.

ROBERT B. GREENWAY, OF SAN BERNARDINO, CALIFORNIA.

CAR-BRAKE-OPERATING MECHANISM.

1,248,480.   Specification of Letters Patent.   Patented Dec. 4, 1917.

Application filed September 7, 1916. Serial No. 118,860.

*To all whom it may concern:*

Be it known that I, ROBERT B. GREENWAY, a citizen of the United States, residing at San Bernardino, in the county of San Bernardino and State of California, have invented a certain new and useful Improvement in Car-Brake-Operating Mechanisms, of which the following is a specification.

My invention relates to improvements in car brake operating mechanisms.

It is particularly adapted for advantageous use on freight cars of the box car type.

One of the objects of my invention is to provide a car brake operating mechanism which may be operated with safety to the brakeman.

Another object of my invention is the provision of novel means for preventing the accidental release of the brakes due to the falling of a rock or dirt upon the top of the car from a hill or mountain side.

Still another object of my invention is to provide means for attaching the brake operating means to the top of a car without liability of starting a leak in the roof of the car.

A further object of my invention is to provide means located substantially in the middle and on the roof of a car by which the brakes of the car may be operated manually or by air brake mechanism carried by the car.

Another object of my invention is to provide a novel take-up drum for the brake operating cable, whereby the leverage of the manually operated member may be increased as the brakes are being applied.

My invention is applicable to any of the usual brake mechanisms which are manually and fluid pressure operated.

The novel features of my invention are hereinafter fully described and claimed.

In the accompanying drawings, which illustrate my invention, Figure 1 is a top view of my improvement shown applied to a box car.

Fig. 2 is a side elevation of the same.

Fig. 3 an enlarged vertical sectional view on the line 3—3 of Fig. 1.
Fig. 4 is a top view of the parts shown in Fig. 3 with the exception of the cover which is shown in horizontal section.

Fig. 5 is a side view of a modified form of the drum casing and cable arrangement.
Similar reference characters designate similar parts in the different views.

1 designates two transverse supporting bars having one set of ends bolted or otherwise secured to the under sides of the usual running boards 2 which are mounted on the roof of the ordinary box car body 3. The other ends of the bars 1 extend downwardly and are bolted or otherwise secured to one side of the car body 3. This manner of securing the bars 1 eliminates the liability of the fastening means thereof effecting leakage in the roof of the car. Secured to the upper sides of the bars 1, closely adjacent to the running boards 2 is a horizontal base plate 4, from which upwardly extend two standards 5, in which is rotatably mounted a horizontal transverse shaft 6, to which is secured a winding drum 8 having a flaring and preferably conoidal periphery, upon which is adapted to be wound an operating cable 7, one end of which is attached to the periphery of the drum adjacent to the end having the greatest diameter.

One end or head 9 of the drum 8 is provided with peripheral ratchet teeth 10 which are normally engaged by a gravity actuated pawl 11 which is pivoted to a standard 12 extending upwardly from the base plate 4. The free end of the pawl 11 is adapted to be depressed by the foot of the operator when the pawl is to be released from the teeth 10.

Also engaging the teeth 10 is a pawl 13, which is pivoted to a hand operated lever 14, one end of which is provided with two arms 15, which are pivoted to the shaft 6.

For releasing the pawl 13, it has secured to it one end of a rod 16, the other end of which is pivoted to a bell crank lever 17, which is pivoted to the lever 14, and which is adapted to be swung to the unlocked position by the operator. For restoring the pawl 13 to the locking position, a coil spring 18 encircles the rod 16 and bears at one end against a collar 19 secured to the rod 16, the other end of the spring bearing against a lateral projection 20 on the lever 14.

For protecting the parts just hereinbefore described, I provide a cover 21 which is attached to the base plate 4 and which is provided in its upper side with a slot 22 through which the lever 14 and rod 16 extend and in which they are adapted to swing in the operation of setting the brakes.

The adjacent side of the cover 21 is provided with a slot 23, through which extends the free end of the foot operated pawl 11.

The cable 7 extends from the drum 8 longitudinally, with respect to the car body 3, to a pulley 24, Figs. 3 and 4, pivotally mounted on the base plate 4. The cable 7 extends from the pulley 24 laterally through a hole 25 in the adjacent side of the cover 21, thence to the top of a pulley 26, which is secured to the car body 3 at one side thereof, Figs. 1 and 2, thence downwardly to the outside of a pulley 27 secured to the bottom of the car body 3 adjacent to the middle of the car body with respect to its length, thence inwardly horizontally to a pulley 28 secured to the under side of the car body 3, thence obliquely horizontally toward the right end of the car body 3, as viewed in Figs. 1 and 2, to a pulley 29 secured to the under side of the car body 3, thence around said pulley 29 toward the opposite end of the car body to one end of the usual horizontal transverse brake operating lever 30, which is pivoted to the under side of the car body 3, and which is connected in a manner well known with the air brake mechanism and with the two sets of brakes, not shown.

In the operation of the mechanism hereinbefore described, in setting the brakes, the brakeman, or other operator, grasps the lever 14, and swings said lever back and forth, thereby rotating the drum 8 through the intermediary of the pawl 13, and thereby winding the cable 7 on said drum, and by said cable swinging the lever 30 to the braking position.

As the drum is of flaring or of conoidal form, and the adjacent end of the rope is attached to that portion of the drum having the greatest diameter, the slack of the cable will be quickly taken up. When the brakes are becoming effective against the car wheels, the cable 7 will be winding upon that portion of the drum which is of small diameter, and the leverage effected by the lever 14 on the drum in winding the cable will be greater than at the beginning of the operation, and this leverage will increase, as the cable winds on the drum. The greatest leverage will thus be obtained at the time most needed, that is, when the brakes shoes bear against the wheels.

To release the brakes, it is but necessary for the operator to depress the right ends of the pawl 11 and the bell crank lever 17, as viewed in Fig. 3, upon which the pawl 11 and 13 will both be freed from the ratchet teeth 10, upon which the tightened cable 7 will retract the drum, and the brakes will be released. After the brakes have been set, the operator swings the lever 14 to the position shown in Fig. 3 and Fig. 4, at which time the lever 14 will contact with the cover 21, so that if a rock or dirt or other object should fall from some point above on top of the closed end of the pawl 11, so as to depress the latter, the pawl 13 would still, by means of the lever 14 and cover 21 hold the drum 8 from being retracted.

In case that an object should fall upon the bell crank lever 17, so as to swing it to the unlocked position, the drum 8 would still be held by the pawl 11. A double safe guard is thus provided against the accidental release, in the manner suggested, of the drum 8. In order that such should occur, both the pawl 11 and the lever 17 would have to be struck by the falling object or objects, an event which is not liable to happen.

It will be noted that the bars 1, and the mechanism which they support are located substantially in the middle of the car, instead of adjacent to one end of the car which is the usual location for the brake operating means. By such central location of the brake operating means upon the roof of the car, the brakeman is not in such a dangerous position, when operating the brakes, nor is he so liable to slip or be thrown from the car, as he is when operating the brakes at one end of the car.

By having the axis of the lever 14 disposed horizontally, and the axis of the drum also disposed horizontally, the lever may be raised to an upright position, in oscillating the drum, in which position it will also afford a means for steadying the brakeman, while, when not in use, the lever may be swung downwardly to a position in which it will not project far above the roof of the car, and the body of the car may, therefore, have a greater height than a car body having the usual vertical shaft provided with a hand wheel.

In order that the brakeman may operate the air brake system, from the place at which he operates the hand operated mechanism, a branch conductor 31, Fig. 1, of the air brake train pipe, not shown, is disposed parallel with and under one of the running boards 2, and is preferably attached to the base plate 4.

The conductor 31 adjacent to the base plate 4 and adjacent to the running board 2 is provided with a cock 32 by which the conductor 31 may have communication or be shut off from communication with the atmosphere.

In Fig. 5 is shown a modified arrangement of the cable 7, in which the latter extends longitudinally through an opening 33 in the cover 21, instead of laterally through the cover as shown in Fig. 4. This arrangement may be employed when the cable is extended to the end instead of to the side of the car, as may sometimes be desired. In other respects, the mechanism shown in Fig. 5 is the same as that shown in Figs. 3 and 4, excepting that the pulley 24 has been omitted.

I do not limit my invention to the structure shown and described, as modifications, within the scope of the appended claims, may be made without departing from the spirit of my invention.

What I claim is:—

1. In car brake operating mechanisms, a car body having a roof provided with a longitudinal running board, brake operating means, and a support for said operating means secured at one end to the running board and extending across the roof and having its other end secured to one side of the car body.

2. In car brake operating mechanisms, a car body having a roof provided with a longitudinal running board, two bars secured at one set of ends to said running board and extending across the roof and having their other set of ends secured to one side of the car body below the roof, and brake operating means mounted on said bars.

3. In car brake operating mechanisms, a rotary drum having peripheral ratchet teeth, a support therefor having a cover provided with two slots, a pawl pivoted to said support and engaging said ratchet teeth and having an arm extending through one of said slots adapted to be depressed by the foot for releasing said pawl, a lever pivoted to said support and extending through the other slot and adapted to engage said cover for limiting its stroke in one direction, a pawl pivoted to said lever under said cover and engaging said ratchet teeth, means carried by the lever for operating the second named pawl, the second named pawl holding the drum from retraction, when the first named pawl is released and the lever is engaged with said cover and has reached the end of its stroke in the said direction, and a brake operating means including a cable attached to said drum, and adapted to be wound thereon.

In testimony whereof I have signed my name to this specification.

ROBERT B. GREENWAY.

Copies of this patent may be obtained for five cents each, by addressing the "Commissioner of Patents, Washington, D. C."